(12) United States Patent
Li et al.

(10) Patent No.: US 11,467,916 B2
(45) Date of Patent: Oct. 11, 2022

(54) METHOD, DEVICE, AND COMPUTER PROGRAM PRODUCT FOR STORAGE MANAGEMENT

(71) Applicant: EMC IP Holding Company LLC, Hopkinton, MA (US)

(72) Inventors: Haitao Li, Chengdu (CN); Yi Wang, Chengdu (CN); Qingxiao Zheng, Chengdu (CN); Ke Li, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 316 days.

(21) Appl. No.: 16/795,301

(22) Filed: Feb. 19, 2020

(65) Prior Publication Data

US 2021/0117281 A1 Apr. 22, 2021

(30) Foreign Application Priority Data

Oct. 17, 2019 (CN) .......................... 201910989890.6

(51) Int. Cl.
*G06F 11/14* (2006.01)
*G06F 3/06* (2006.01)

(52) U.S. Cl.
CPC ........ *G06F 11/1461* (2013.01); *G06F 3/0608* (2013.01); *G06F 3/0616* (2013.01); *G06F 3/0619* (2013.01); *G06F 3/0652* (2013.01); *G06F 3/0653* (2013.01); *G06F 3/0673* (2013.01); *G06F 11/1451* (2013.01); *G06F 11/1469* (2013.01)

(58) Field of Classification Search
CPC ............. G06F 11/1451; G06F 11/1458; G06F 11/1461; G06F 11/1469; G06F 11/1448
See application file for complete search history.

(56) References Cited

U.S. PATENT DOCUMENTS

| | | | |
|---|---|---|---|
| 7,904,679 B2* | 3/2011 | Stager | G06F 11/1448 711/163 |
| 10,162,709 B1* | 12/2018 | Lazier | G06F 11/1451 |
| 11,256,715 B2* | 2/2022 | Shi | G06F 16/2358 |

* cited by examiner

*Primary Examiner* — Nadeem Iqbal
(74) *Attorney, Agent, or Firm* — Womble Bond Dickinson (US) LLP

(57) ABSTRACT

Embodiments of the present disclosure provide a method, a device and a computer program product for storage management. The method comprises: obtaining time information related to a removal time point for a backup storage system, the time information indicating that a chunk in the backup storage system whose expiration time does not exceed the removal time point is to be removed; determining, from a removal period list, a target removal period whose end time does not exceed the removal time point, each removal period in the removal period list being mapped to at least one chunk element, the at least one chunk element representing at least one chunk in the backup storage system whose expiration time is within the removal period to which the at least one chunk element is mapped; determining at least one target chunk element to which the target removal period is mapped; and removing, from the backup storage system, at least one target chunk corresponding to the at least one target chunk element. Therefore, with this solution, expired chunks can be efficiently removed.

21 Claims, 11 Drawing Sheets

METHOD, DEVICE, AND COMPUTER PROGRAM PRODUCT FOR STORAGE MANAGEMENT

CROSS-REFERENCE TO RELATED APPLICATION

This patent application claims priority, under 35 U.S.C. § 119, of Chinese Patent Application No. 201910989890.6, filed Oct. 17, 2019, which is incorporated by reference herein in its entirety.

FIELD

Embodiments of the present disclosure generally relate to the field of storage management, and more specifically, to a method, a device and a computer program product for storage management.

BACKGROUND

Backup storage systems have a garbage collection process or thread to maintain an expiration date of backup data. The garbage collection process or thread periodically walks through all backup data to find which backup data needs to be deleted and which backup data should be retained. Therefore, an efficient garbage collection process is required to improve the efficiency of the backup storage system.

SUMMARY

Embodiments of the present disclosure provide a method, a device and a computer program product for storage management.

In accordance with the first aspect of the present application, a method is provided for storage management. The method comprises: obtaining time information related to a removal time point for a backup storage system, the time information indicating that a chunk in the backup storage system whose expiration time does not exceed the removal time point is to be removed; determining, from a removal period list, a target removal period whose end time does not exceed the removal time point, each removal period in the removal period list being mapped to at least one chunk element, the at least one chunk element representing at least one chunk in the backup storage system whose expiration time is within the removal period to which the at least one chunk element is mapped; determining at least one target chunk element to which the target removal period is mapped; and removing, from the backup storage system, at least one target chunk corresponding to the at least one target chunk element.

In accordance with the second aspect of the present application, a device is provided for storage management. The device comprises at least one processing unit and at least one memory. The at least one memory is coupled to the at least one processing unit and stores instructions executed by the at least one processing unit. The instructions, when executed by the at least one processing unit, cause the device to perform acts including: obtaining time information related to a removal time point for a backup storage system, the time information indicating that a chunk in the backup storage system whose expiration time does not exceed the removal time point is to be removed; determining, from a removal period list, a target removal period whose end time does not exceed the removal time point, each removal period in the removal period list being mapped to at least one chunk element, the at least one chunk element representing at least one chunk in the backup storage system whose expiration time is within the removal period to which the at least one chunk element is mapped; determining at least one target chunk element to which the target removal period is mapped; and removing, from the backup storage system, at least one target chunk corresponding to the at least one target chunk element.

In accordance with the third aspect of the present application, a computer program product is provided tangibly stored on a non-transitory computer-readable medium and comprising machine-executable instructions that, when executed, cause a machine to perform any steps of the method described in the first aspect of the present application.

The Summary of the invention is provided to introduce a selection of concepts in a simplified form, which are further described in the Detailed Description. The Summary is neither intended to identify key features or essential features of the present disclosure nor to limit the scope of the present invention.

BRIEF DESCRIPTION OF THE DRAWINGS

Through the following detailed description with reference to the accompanying drawings, the above and other objectives, features, and advantages of example embodiments of the present disclosure will become more apparent. In the exemplary embodiments of the present disclosure, the same reference numerals generally denote the same components.

DETAILED DESCRIPTION OF EMBODIMENTS

Figure 1:
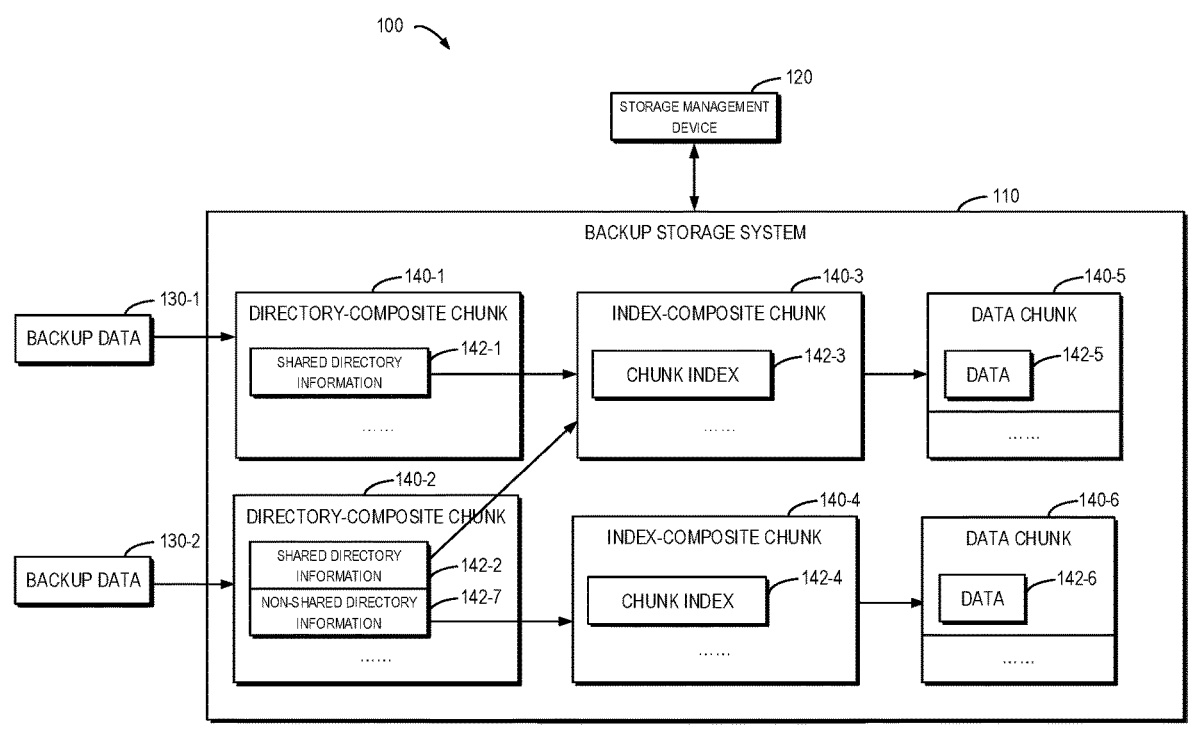
FIG. 1 is a diagram illustrating an example of a storage management environment according to embodiments of the present disclosure.

Preferred embodiments of the present disclosure will be described in more detail below with reference to the accompanying drawings. While the preferred embodiments of the present invention have been shown in the drawings, it should be understood that the present disclosure may be embodied in various forms and not limited by the embodiments set forth herein. Rather, the embodiments are provided so that this disclosure will be thorough and complete, and the scope of the disclosure may be fully conveyed to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be understood as "at least one other embodiment." The terms "first," "second," and the like may refer to different or identical objects. Other explicit and implicit definitions may be included below.

As discussed above, a garbage collection process or thread of a backup storage system periodically walks through all backup data to find which needs to be deleted, which should be retained. When the backup storage system is just setup, there is not much data in the backup storage system. Walking through all backup data only takes a small amount of time, such as several seconds or minutes. After the backup storage system is running for a period of time, backup data increasingly grows in the backup storage system. In this case, time is spent on walking through all backup data to remove the expired backup data, so the time to perform garbage collection becomes longer and longer, for example, it may be up to several hours.

In a chunk-based backup storage system, the garbage collection process is performed on a chunk. A chunk includes a data chunk, an index-composite chunk, and a directory-composite chunk. The data chunk is used to store backup data in the backup storage system. In some embodiments, the backup data can be split into multiple sections and each section can be stored in a separate data chunk. The index-composite chunk is used to store an index of a data chunk referring to the data chunk. The directory-composite chunk is used to store directory information of a directory or a path where backup data is located. The directory information refers to an index-composite chunk, and the chunk index stored in the index-composite chunk refers to a data chunk that stores a portion of the backup data existing at the directory or the path indicated by the directory information.

Conventionally, in order to perform garbage collection in a chunk-based backup storage system, the garbage collection process or thread walks through the directory information in the directory-composite chunk, and obtains the index-composite chunk referred by the directory information. An index-composite chunk and data chunks it refers to cannot be removed until all backup data referred by the index-composite chunk has expired. Specifically, the garbage collection process or thread checks each directory information to determine whether it refers to an index-composite chunk. If an index-composite chunk is referred to, it is determined whether the backup data referred by the index-composite chunk has expired. If any backup data referred by the index-composite chunk has not yet expired, the index-composite chunk and the data chunks it refers to are retained. Conversely, if all backup data referred by the index-composite chunk has expired, the index-composite chunk and the data chunks it refers to are removed. Time complexity of such a garbage collection process is $O(n^2)$.

Obviously, the conventional garbage collection process consumes a large amount of time in a large data backup storage system. The long garbage collection process not only consumes excessive resources of the backup storage system, but also significantly affects the efficiency of the backup storage system.

According to an example embodiment of the present disclosure, an improved solution for storage management is proposed. In this solution, time information related to a removal time point for a backup storage system is obtained. The time information indicates that a chunk in the backup storage system whose expiration time does not exceed the removal time point is to be removed. A target removal period whose end time does not exceed the removal time point is determined from a removal period list. Each removal period in the removal period list is mapped to at least one chunk element. The at least one chunk element represents at least one chunk in the backup storage system whose expiration time is within the removal period to which the at least one chunk element is mapped. Since a mapping relationship exists between the removal period and the chunk element, at least one target chunk element to which the target removal period is mapped can be determined. Furthermore, since a chunk element represents a chunk, at least one target chunk corresponding to the at least one target chunk element can be removed from the backup storage system.

In this way, there is no need to walk through the directory information in the directory-composite chunk to obtain the index-composite chunk referred by the directory information. Also, there is no need to remove the index-composite chunk and data chunks it refers to by determining whether all backup data referred by the index-composite chunk has expired. It only needs to quickly determine a chunk to be removed through the mapping relationship between a removal period, a chunk element and a chunk. Therefore, this solution can realize an efficient garbage collection process.

Hereinafter, embodiments of the present disclosure will be described in detail with reference to FIGS. 1-12. FIG. 1 is a diagram illustrating an example of a storage management environment 100 according to embodiments of the present disclosure. The storage management environment 100 includes a backup storage system 110 and a storage management device 120. The backup storage system 110 may be used to store backup data 130-1 and 130-2 (hereinafter, collectively referred to as "backup data 130").

The backup storage system 110 is a chunk-based system. As shown in FIG. 1, the backup storage system 110 may include chunks 140-1 to 140-6 (hereinafter, collectively referred to as "chunk 140"). The chunk may include a directory-composite chunk, an index-composite chunk and a data chunk. For example, the chunks 140-1 and 140-2 store directory information (such as shared directory information 142-1 and 142-2 and non-shared directory information 142-7), which may also be referred to as directory-composite chunks. Similarly, chunks 140-3 and 140-4 store chunk indexes, such as chunk indexes 142-3 and 142-4, which may also be referred to as index-composite chunks. In addition, chunks 140-5 and 140-6 store data, such as data 142-5 and 142-6, which may also be referred to as data chunks. It should be understood that the number and reference relationship of the backup data 130 and the chunk 140 shown in FIG. 1 are exemplary and may be any appropriate number and reference relationship.

The directory-composite chunk can be used to store the directory information of the backup data in the backup storage system. The directory information may refer to an index-composite chunk, and the chunk index stored in the index-composite chunk refers to a data chunk that stores a portion of backup data that exists at a location (e.g., a directory or path) indicated by the directory information.

Specifically, as shown in FIG. 1, the directory-composite chunks 140-1 and 140-2 may be used to store the directory information of the backup data 130-1 and 130-2, respectively. In some embodiments, the directory information may be shared directory information or non-shared directory information. For example, the directory-composite chunks 140-1 and 140-2 of the backup data 130-1 and 130-2 store directory information "/home/working/test.txt", so the directory information is shared directory information 142-1 and 142-2. In contrast, only the directory-composite chunk 140-2 of the backup data 130-2 stores the directory information "/usr/local", and thereby this directory information is the non-shared directory information 142-7.

Directory information can refer to index-composite chunks. As shown in FIG. 1, the non-shared information 142-7 in the directory-composite chunk 140-2 of the backup data 130-2 refers to the index-composite chunk 140-4. The shared directory information 142-1 in the directory-composite chunk 140-1 of the backup data 130-1 may refer to the index-composite chunk 140-3. Likewise, the shared directory information 142-2 in the directory-composite chunk 140-2 of the backup data 130-2 may also refer to the index-composite chunk 140-3. It can be seen that the backup data 130-1 and the backup data 130-2 share the index-composite chunk 140-3.

The index-composite chunk can be used to store the index of the data chunk, to refer to the data chunk. For example, the chunk index 142-3 stored in the index-composite chunk 140-3 may point to the data chunk 140-5, and the chunk index 142-4 stored in the index-composite chunk 140-4 may point to the data chunk 140-6. It should be understood that although FIG. 1 only shows that the index-composite chunks 140-3 and 140-4 store one chunk index, each index-composite chunk can store multiple chunk indexes and each chunk index points to a corresponding data chunk.

Data chunks can be used to store backup data. In some embodiments, the backup data can be split into multiple sections, and each section can be stored in a separate data chunk. For example, the data 142-5 of the backup data 130-1 located at the shared directory may be stored in the data chunk 140-5. In addition, the data 142-5 of the backup data 130-2 located at the shared directory may be stored in the data chunk 140-5, while the data 142-6 of the backup data 130-2 located at the non-shared directory may be stored in the data chunk 140-6.

The storage management device 120 may manage operations of the backup storage system 110, and in particular, manage the chunks 140 in the backup storage system 110. As shown in FIG. 1, the storage management device 120 is implemented outside the backup storage system 110. Alternatively, the storage management device 120 may be implemented within the backup storage system 110, and its implementation location is not limited. The storage management device 120 may include, but is not limited to, any computing device such as a cloud computing device, a mainframe computer, a server, a personal computer, a desktop computer, a laptop computer, a tablet computer, and a personal digital assistant. The operations performed by the storage management device 120 will be described in detail below with reference to FIGS. 2 to 11.

Figure 2:
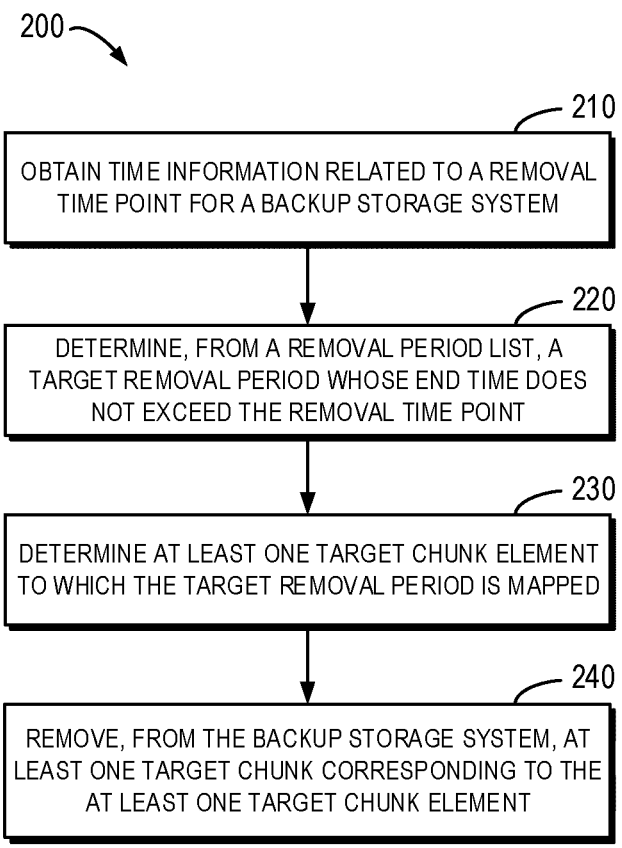
FIG. 2 is a flowchart illustrating a method for storage management according to embodiments of the present disclosure.
Figure 3:
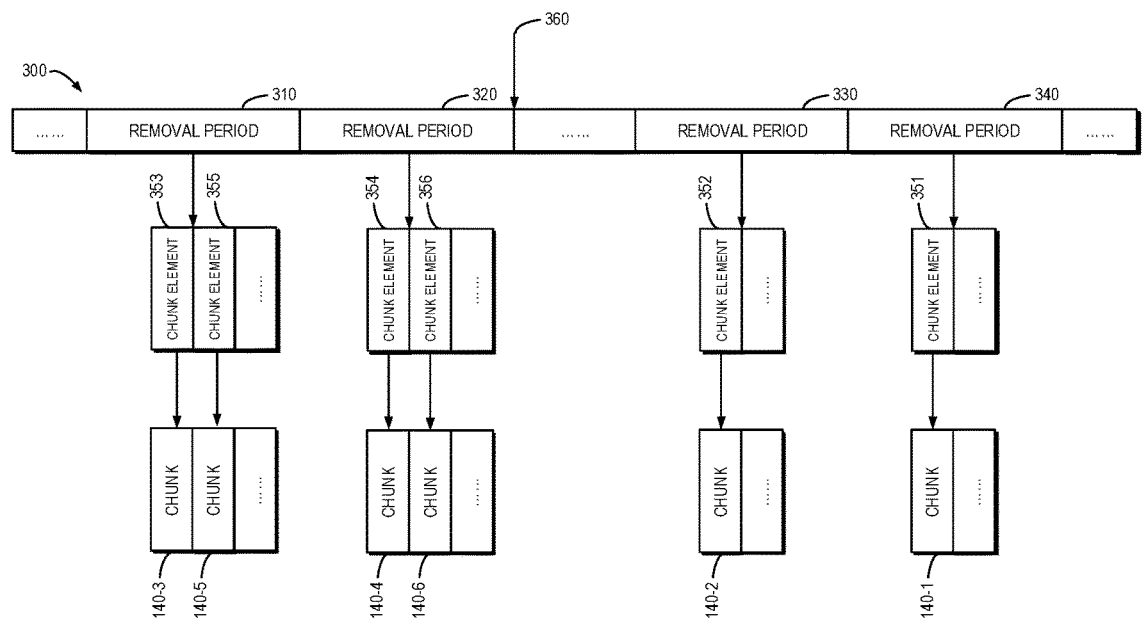
FIG. 3 is a diagram illustrating an example of a target chunk, a target chunk element and a target removal period according to embodiments of the present disclosure.

FIG. 2 is a flowchart illustrating a method 200 for storage management according to embodiments of the present disclosure. For example, the method 200 may be performed by the storage management device 120 as shown in FIG. 1. It should be understood that the method 200 may further include additional steps not shown and/or omit steps shown, and the scope of the present disclosure is not limited in this regard. For ease of understanding, the method 200 will be described with reference to FIG. 3. FIG. 3 is a diagram illustrating an example of a target chunk, a target chunk element and a target removal period according to some embodiments of the present disclosure.

At 210, the storage management device 120 obtains time information related to a removal time point for the backup storage system 110. The time information indicates that a chunk in the backup storage system 110 whose expiration time does not exceed the removal time point is to be removed. As shown in FIG. 3, the storage management device 120 may obtain time information for the removal time point 360. For example, the removal time point 360 may be 24:00 on Oct. 15, 2019.

At 220, the storage management device 120 determines, from a removal period list, a target removal period whose end time does not exceed the removal time point. The removal period list is predefined and includes one or more removal periods. As shown in FIG. 3, the removal period list 300 includes a plurality of removal periods 310-340. For example, the removal period 310 may be from 00:00 to 24:00 on Oct. 14, 2019, the removal period 320 may be from 00:00 to 24:00 on Oct. 15, 2019, the removal period 330 may be from 04:00 to 24:00 on Nov. 13, 2019 and the removal period 340 may be from 04:00 on Nov. 14, 2019 to 24:00 on Nov. 13, 2020. The removal period may represent a period in which expired chunks are removed for garbage collection. For example, if the garbage collection process occurs daily, the length of the removal period can be 1 day. The storage management device 120 may determine, from the removal period list 300, the target removal periods 310 and 320 whose end time does not exceed the removal time point 360 (24:00 on Oct. 15, 2019).

Each removal period in the removal period list 300 is mapped to at least one chunk element. The at least one chunk element represents at least one chunk in the backup storage system whose expiration time is within a removal period to which the at least one chunk element is mapped. As shown in FIG. 3, the removal period 310 is at least mapped to chunk elements 353 and 355, where the chunk elements 353 and 355 represent the chunks 140-3 and 140-5, respectively, and the expiration time of chunks 140-3 and 140-5 falls in the removal period 310. Removal period 320 is mapped to at least chunk elements 354 and 356, where the chunk elements 354 and 356 represent the chunks 140-4 and 140-6, respectively, and the expiration time of the chunks 140-4 and 140-6 falls in the removal period 320. The removal period 330 is mapped at least to a chunk element 352, where the chunk element 352 represents the chunk 140-2, and the expiration time of the chunk 140-2 falls in the removal period 330. The removal period 340 is mapped to at least the chunk element 351, where the chunk element 351 represents the chunk 140-1, and the expiration time of the chunk 140-1 falls in the removal period 340. It should be understood that the number and the mapping relationship of the removal period, chunk elements and chunks shown in FIG. 3 are exemplary, and may be any appropriate number and mapping relationship.

Figure 4:
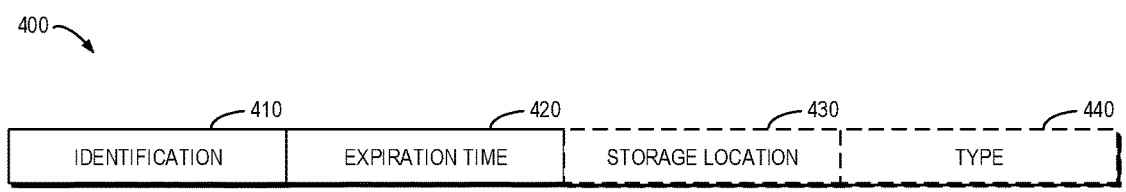
FIG. 4 is a diagram illustrating an example of a chunk element according to embodiments of the present disclosure.

FIG. 4 is a diagram illustrating an example of a chunk element 400 according to embodiments of the present disclosure. The chunk element 400 may include identification 410 of a chunk represented by the chunk element. The identification 410 of the chunk may be used to uniquely determine the chunk in the backup storage system 110. The chunk element 400 may further include expiration time 420 of the chunk represented by the chunk element.

The expiration time 420 of the chunk is the latest expiration time of all backup data 130 that refers to the chunk. For a newly created chunk, its expiration time 420 is the expiration time of the backup data for which the chunk is created. For an existing chunk, if a new backup data refers to the chunk, the expiration time can be determined by the following formula (1):

$$E = \begin{cases} e_i & \text{if } (i = 1) \\ \text{MAX}(e_i) & \text{if } (i > 1) \end{cases}$$

wherein E represents expiration time, $e_i$ represents expiration time for the $i^{th}$ backup data referring to the chunk, and MAX( ) represents taking the maximum value.

Optionally, the chunk element 400 may further include a storage location 430 of the chunk element. For example, at least one chunk element to which the removal period is mapped may be organized as a chunk list. Each chunk element in the chunk list can have the same structure and size. In this case, each chunk element may have a fixed offset in the chunk list. Therefore, the offset of the chunk element in the chunk list can be used as the storage location 430 of the storage element, to support finding the chunk element directly in the chunk list. In some embodiments, the storage location 430 may be determined based on hashing the identification 410 of the chunk.

Further, the chunk element 400 may optionally further include a type 440 of the chunk represented by the chunk element. It can be known from the foregoing that the type 440 may be selected from the following type groups: a directory-composite chunk type; a data chunk type; and an index-composite chunk type. In this manner, the chunk element 400 has rich information about the chunk element and the chunk it represents, to support an efficient garbage collection process.

Referring back to FIG. 2, at 230, the storage management device 120 determines at least one target chunk element to which the target removal period is mapped. For example, the storage management device 120 may determine the target chunk elements 353 and 355 and the target chunk elements 354 and 356 to which the target removal periods 310 and 320 are mapped, respectively. At 240, the storage management device 120 removes at least one target chunk corresponding to the at least one target chunk element from the backup storage system 110. For example, the storage management device 120 may remove the target chunks 140-3, 140-5, 140-4, and 140-6 corresponding to the target chunk elements 353, 355, 354, and 356 from the backup storage system 110, respectively.

In some embodiments, the storage management device 120 may also remove a target removal period and at least one target chunk element in accordance with a determination that at least one target chunk is removed. For example, when it is determined that the target chunks 140-3, 140-5, 140-4, and 140-6 are removed, the storage management device 120 may also remove the target removal periods 310 and 320 and the target chunk elements 353, 355, 354, and 356. In this way, expired removal periods and target chunk elements can be removed accordingly.

Figure 5:
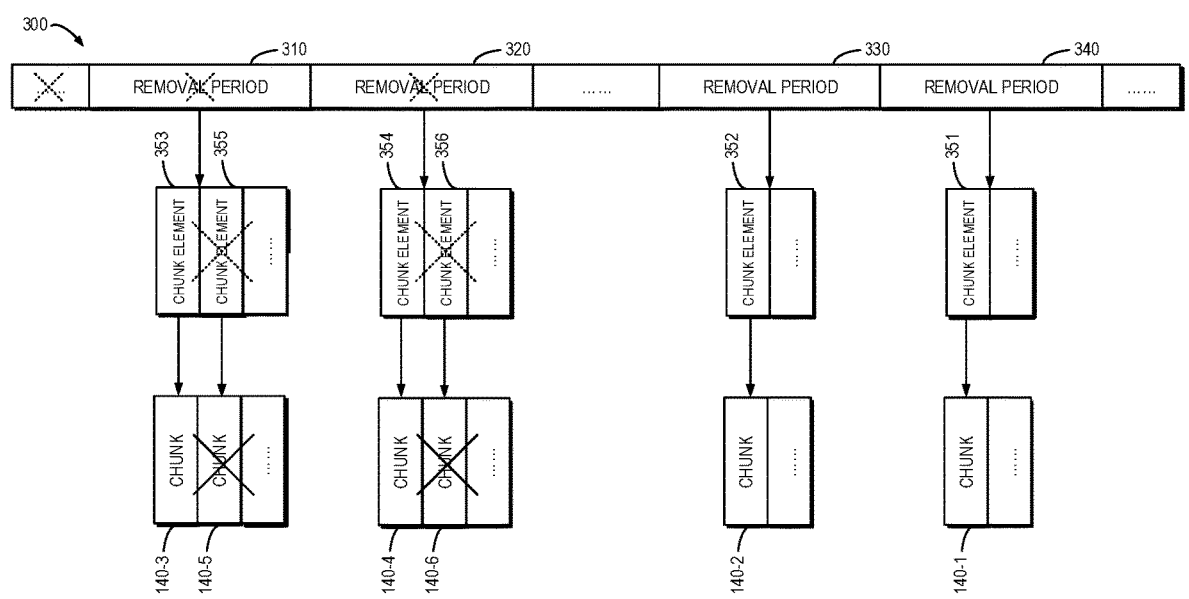
FIG. 5 is a flowchart illustrating an example of removing a target chunk, a target chunk element and a target removal period according to embodiments of the present disclosure.

FIG. 5 is a flowchart illustrating an example of removing a target chunk, a target chunk element and a target removal period according to embodiments of the present disclosure. It can be seen that the target removal periods 310 and 320, etc. whose end time does not exceed the removal time point 360, the target chunk elements 353, 355, 354, and 356 to which these target removal periods are mapped, and the chunks 140-3, 140-5, 140-4, and 140-6 represented by these chunk elements are removed.

It should be understood that the removed target chunk, the target chunk element, and the target removal period are exemplary. In fact, the removal period whose end time does not exceed the removal time point 360, all the chunk elements to which each of these removal periods are mapped and the chunks represented by these chunk elements can be removed.

In this way, it is possible to quickly determine the target chunk to be removed and the target chunk element and the target period to be removed accordingly by the mapping relationship of the removal period, the chunk element and the chunk. Further, when garbage collection is performed with the removal period, since each garbage collection process is performed for the first removal period in the removal period list 300, there is no need to search target removal period in the removal period list 300. Therefore, an efficient garbage collection process is implemented and its time complexity is only O(n).

Further, in some embodiments, since the expiration time of the chunk may be too long (for example, several years later), the removal period list 300 may be too long. In order to limit the size of the removal period list 300, a removal period with an extended length may be set in the removal period list 300. For example, a removal period 340 with a length of one year may be set in the removal period list 300 (for example, 00:00 on Nov. 14, 2019 to 24:00 on Nov. 13, 2020).

After the garbage collection process, due to the removal of expired target removal periods (e.g., target removal periods 310 and 320), the size of the removal period list 300 is reduced, so the removal period with an extended length can be re-divided to create a new removal period in the removal period list 300. In the following, some example embodiments of such re-division process will be described in conjunction with FIGS. 6 and 7.

Figure 6:
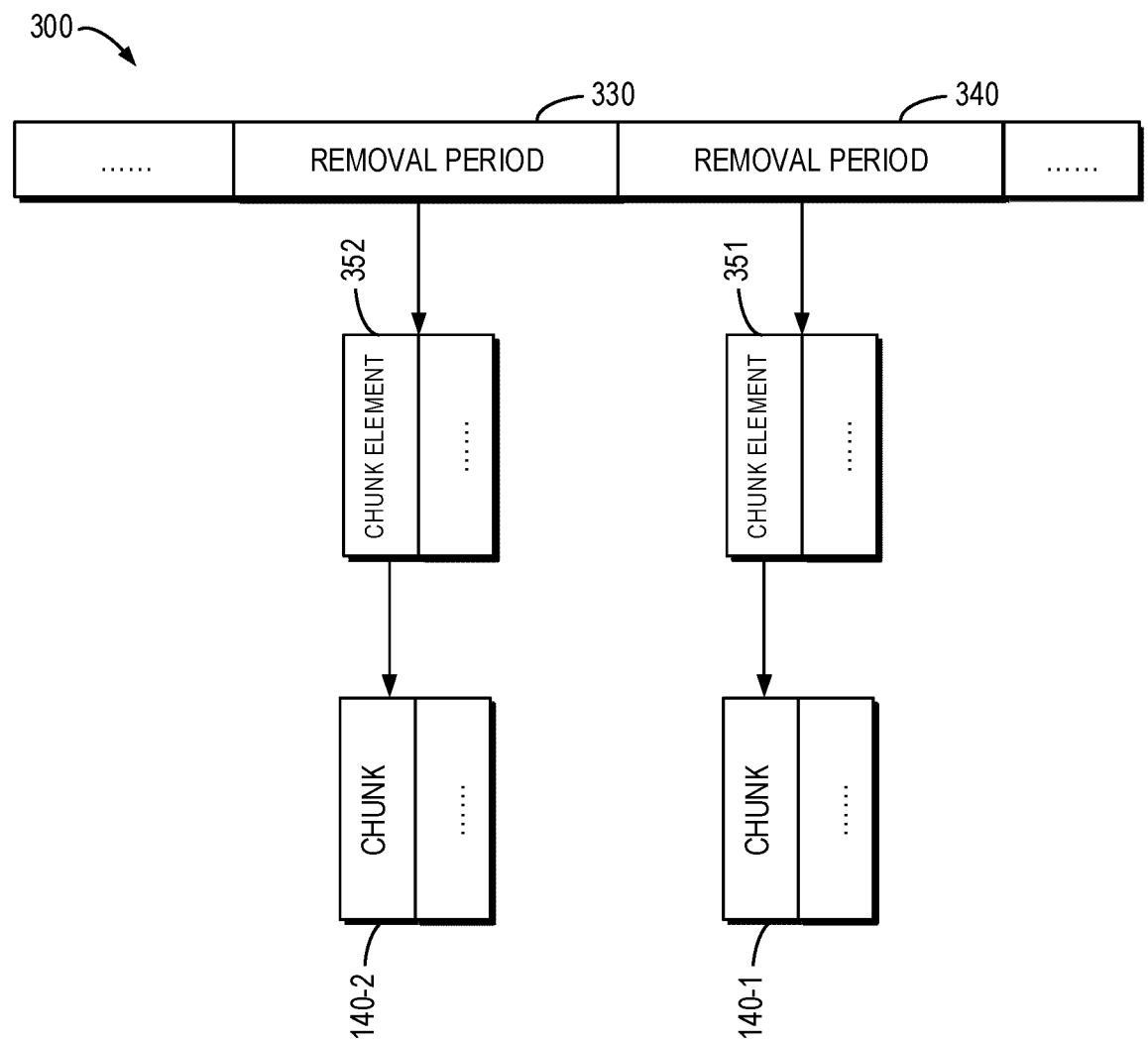
FIG. 6 is a diagram illustrating an example of chunks, chunk elements and removal periods after removal according to embodiments of the present disclosure.

FIG. 6 is a diagram illustrating an example of chunks, chunk elements and removal periods after removal according to embodiments of the present disclosure. As shown in FIG. 6, after the target removal period, the target chunk element, and the target chunk are removed, the removal period 330 and the chunk element 352 and chunk 140-2 to which the removal period 330 is mapped are retained, as well as the removal period 340 and the chunk element 351 and the chunk 140-1 to which the removal period 340 is mapped.

Figure 7:
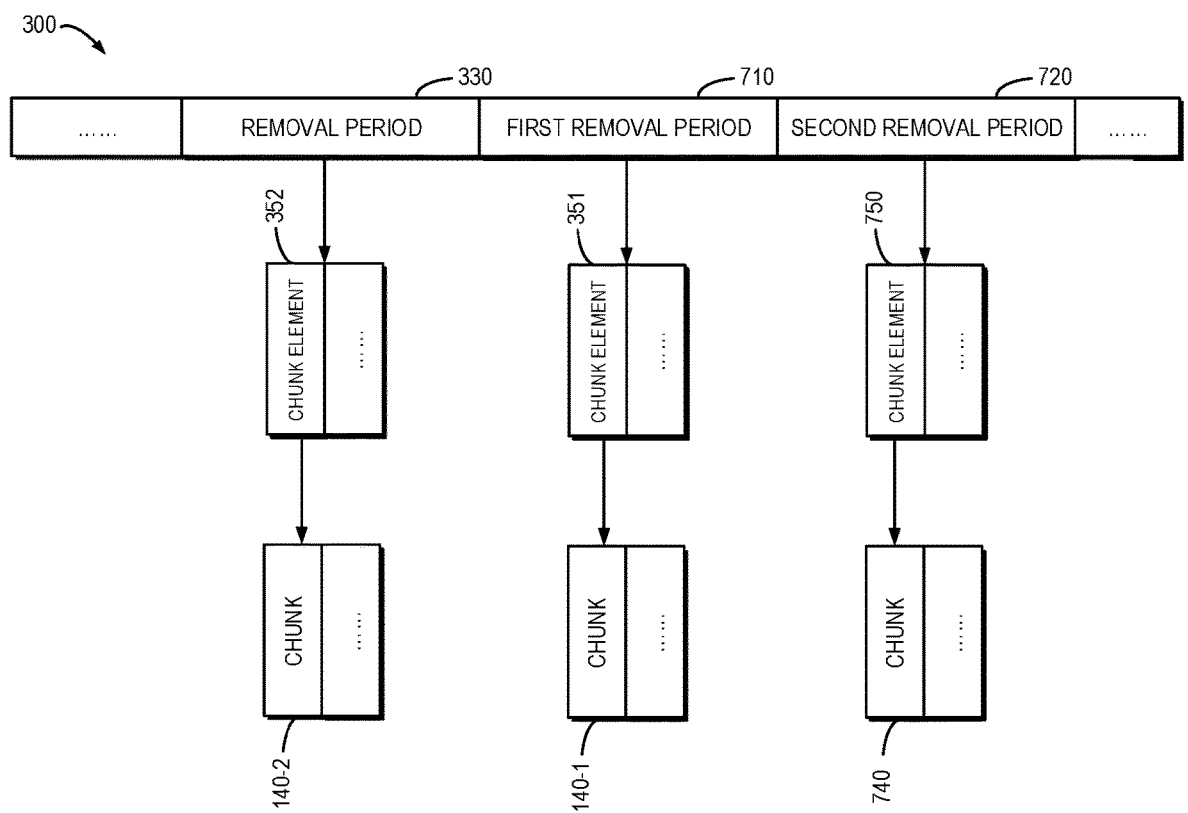
FIG. 7 is a diagram illustrating an example of re-dividing a removal period according to embodiments of the present disclosure.

In this case, the storage management device 120 may divide the removal period to be removed in the removal period list 300 into at least a first removal period and a second removal period in accordance with a determination that the target removal period and at least one target chunk element is removed. FIG. 7 is a diagram illustrating an example of re-dividing a removal period according to some embodiments of the present disclosure. As shown in FIG. 7, the removal period 340 to be removed in the removal period list 300 (for example, 00:00 on Nov. 14, 2019 to 24:00 on Nov. 13, 2020) can be divided into at least the first removal period 710 (for example, 00:00 to 24:00 on Nov. 14, 2019) and second removal period 720 (for example, 00:00 on Nov. 15, 2019 to 24:00 on Nov. 13, 2020).

In addition, the storage management device 120 may divide at least one chunk element, to which the removal period 340 to be divided is mapped, into a first group of chunk elements and a second group of chunk elements. The expiration time of the chunks in the backup storage system 110 represented by the first group of chunk elements falls within the first removal period 710, and the expiration time of the chunks in the backup storage system 110 represented by the second group of chunk elements falls within the second removal period 720.

For example, the expiration time of chunk 140-1 is 24 o'clock on Nov. 14, 2019 and the expiration time of chunk 740 is 24 o'clock on Dec. 31, 2019. In this case, since the expiration time of the chunk 140-1 falls within the first removal period 710, the chunk element 351 representing the chunk 140-1 may be divided into the first group of chunk elements. In contrast, since the expiration time of the chunk 740 falls within the second removal period 720, the chunk element 750 representing the chunk 740 may be divided into a second group of chunk elements.

Then, the storage management device 120 may map the first group of chunk elements (such as chunk element 351, etc.) to the first removal period 710, and map the second group of chunk elements (such as chunk element 750, etc.) to the second removal period 720.

In this way, the size of the removal period list is limited by setting a removal period with an extended length and re-dividing the removal period. Thereby, the resource consumption of the garbage collection process is further reduced.

The above describes the operations performed by the storage management device 120 during the garbage collection process of removing the target chunk, the target chunk element, and the target period. Hereinafter, operations performed by the storage management device 120 when a new chunk is created will be further described with reference to FIGS. 8 and 9.

Figure 8:
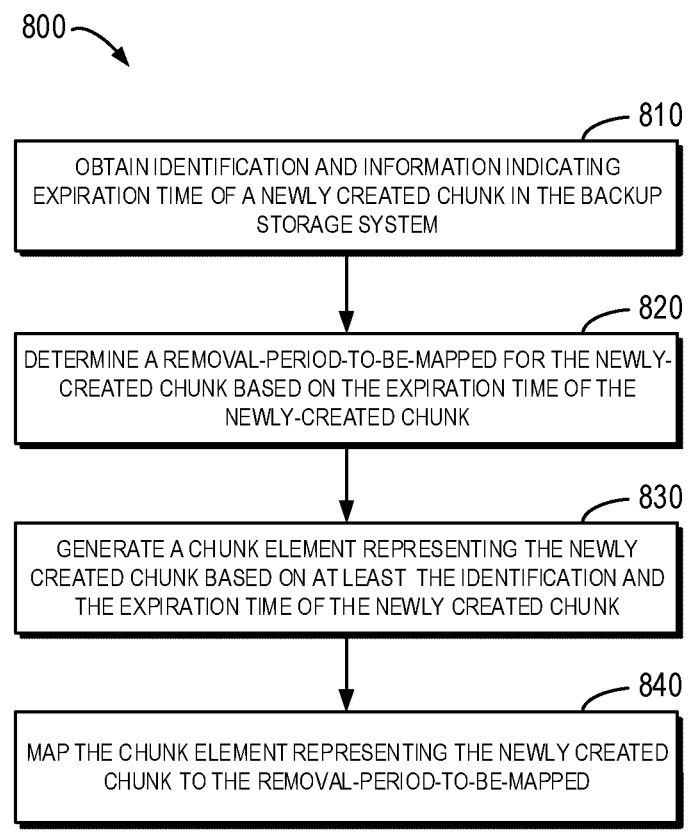
FIG. 8 is a flowchart illustrating a method of creating a chunk element according to embodiments of the present disclosure.
Figure 9:
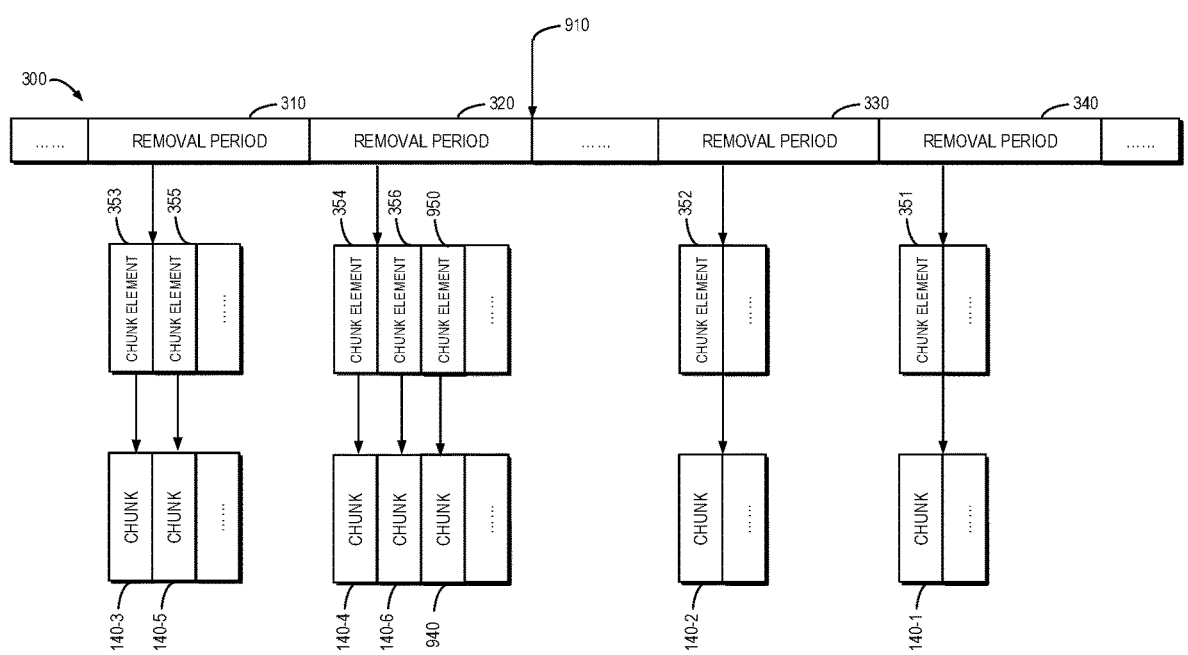
FIG. 9 is a diagram illustrating an example of creating a chunk element according to embodiments of the present disclosure.

FIG. 8 is a flowchart illustrating a method 800 of creating a chunk element according to some embodiments of the present disclosure. For example, the method 800 may be performed by the storage management device 120 as shown in FIG. 1. It should be understood that the method 800 may also include additional steps not shown and/or omit steps shown and the scope of the present disclosure is not limited in this regard. For ease of understanding, the method 800 will be described with reference to FIG. 9. FIG. 9 is a diagram illustrating an example for creating a chunk element according to some embodiments of the present disclosure.

At 810, the storage management device 120 may obtain information and identification indicating expiration time of a newly created chunk in the backup storage system 110. As shown in FIG. 9, a chunk 940 is newly created. For example, it expires at 24:00 on Nov. 15, 2019 and is identified as "chunk 940".

At 820, the storage management device 120 may determine a removal period to be mapped for the newly created chunk 940 from the removal period list 300 based on the expiration time 910 of the newly created chunk 940. As shown in FIG. 9, since the expiration time 910 of the newly created chunk 940 falls within the removal period 320 (for example, 00:00 to 24:00 on Oct. 15, 2019), the removal period 320 may be determined as a removal period to be mapped.

At 830, the storage management device 120 may generate a chunk element 950 representing the newly created chunk 940 based on at least the expiration time 910 and identification of the newly created chunk 940. As described above, in the example of FIG. 9, the identification of the chunk 940 may be used to uniquely determine the chunk in the backup storage system 110. The expiration time of the chunk 940 is the latest expiration time of all backup data referred by the chunk 940.

In some embodiments, in order to generate the chunk element 950, the storage management device 120 may also determine the type of the newly created chunk 940 and the storage position for storing the chunk element 950 representing the newly created chunk 940. It can be known from the foregoing that the type may be selected from the following type groups: a directory-composite chunk type used to store the directory information of the backup data in the backup storage system 110; a data chunk type used to store the backup data and an index-composite chunk type used to store an index of the data chunk 140.

In addition, as described above, at least one chunk element (such as chunk elements 354, 356, and 950, etc.) to which the removal period 320 is mapped may be organized into a chunk list. The storage location may be an offset of the chunk element 950 in the chunk list, to support finding the chunk element 950 directly in the chunk list. In some embodiments, the storage location may be determined based on hashing the identification "chunk 940" of the chunk 940. For example, the storage location determined by hashing the identification "chunk 940" of the chunk 940 is an offset of the size of two chunks.

After generating the chunk element 950 representing the newly created chunk 940, the storage management device 120 may map the generated chunk element 950 to the removal period to be mapped 320 at 840. In this way, the mapping relationship between the newly created chunk and the chunk element representing the newly created chunk and the removal period can be easily established, thereby supporting the proposed efficient garbage collection process.

Figure 10:
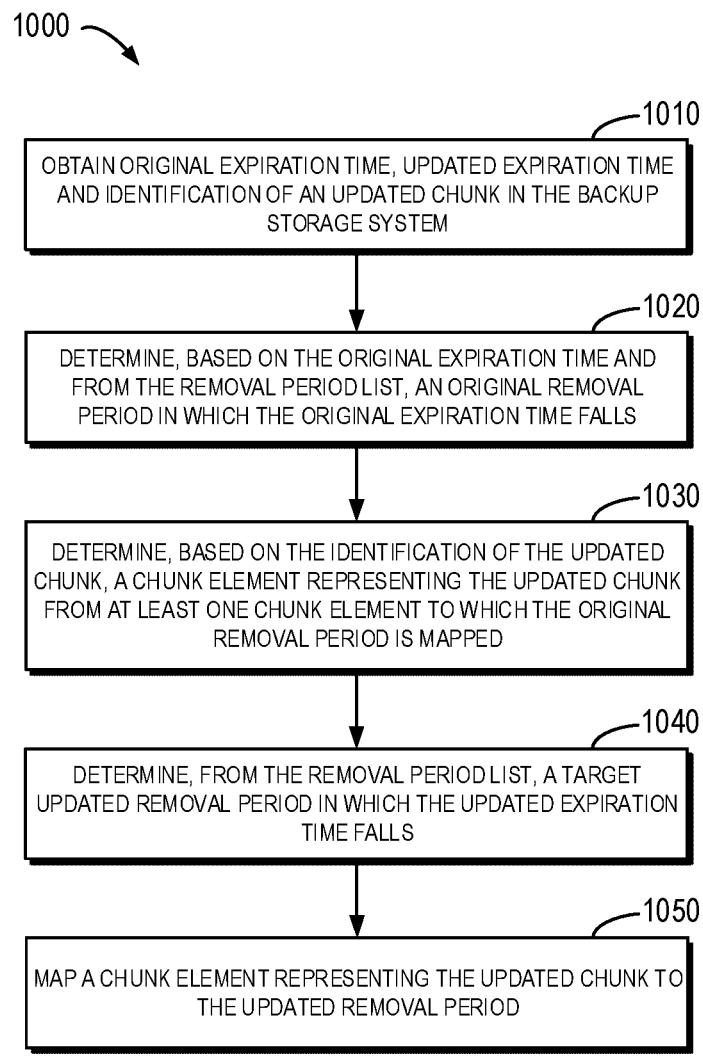
FIG. 10 is a flowchart illustrating a method of updating a chunk element according to embodiments of the present disclosure.
Figure 11:
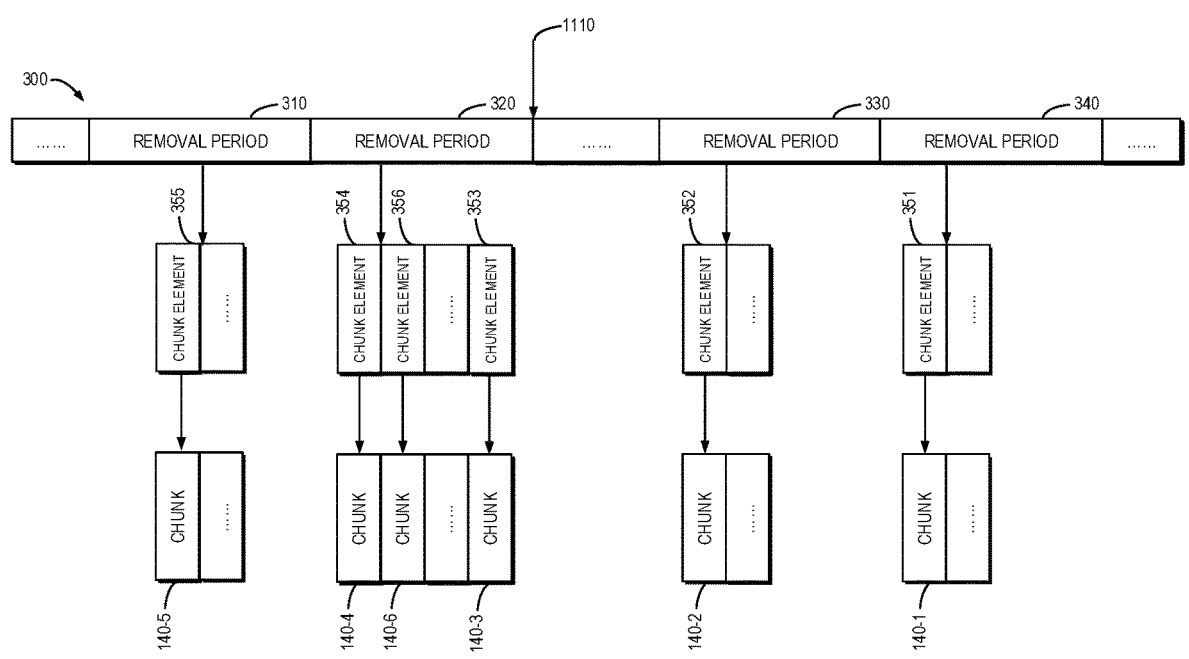
FIG. 11 is a diagram illustrating an example of updating a chunk element according to embodiments of the present disclosure.

In addition, operations performed by the storage management device 120 when the expiration time of the chunk changes will be further described with reference to FIGS. 10 and 11. FIG. 10 is a flowchart illustrating a method 1000 of updating a chunk element according to some embodiments of the present disclosure. For example, the method 1000 may be performed by the storage management device 120 as shown in FIG. 1. It should be understood that the method 1000 may further include additional steps not shown and/or omit steps not shown and the scope of the present disclosure is not limited in this regard. For ease of understanding, the method 1000 will be described with reference to FIG. 11. FIG. 11 is a diagram illustrating an example of updating a chunk element according to some embodiments of the present disclosure.

At 1010, the storage management device 120 may obtain the original expiration time, updated expiration time, and identification of the updated chunks in the backup storage system 110. For example, the expiration time of the chunk 140-3 identified as "chunk_140-3" is updated from 24 o'clock on Oct. 14, 2019 to 24 o'clock on Oct. 15, 2019. In this case, the original expiration time of the chunk 140-3 can be obtained at 24 o'clock on Oct. 14, 2019, the updated expiration time of 24 o'clock on Oct. 15, 2019 and the identification "chunk 140-3".

At 1020, the storage management device 120 may determine the original removal period in which the original expiration time falls from the removal period list 300 based on the original expiration time. For example, since the original expiration time, 24 o'clock on Oct. 14, 2019, of chunk 140-3 falls within the removal period 310 (00:00 to 24:00 on Oct. 14, 2019), the removal period 310 can be determined as the original removal period.

At 1030, the storage management device 120 may determine a chunk element representing the updated chunk from at least one chunk element to which the original removal period is mapped based on the identification of the updated chunk. For example, based on the identification "chunk 140-3" of the updated chunk 140-3, the chunk element 353 representing the updated chunk 140-3 can be determined from at least one chunk element (such as chunk elements 353, 355, etc.) to which the original removal period 310 is mapped. In some embodiments, the identification "chunk 140-3" of the updated chunk 140-3 may be hashed to determine its storage location, and thereby the chunk element 353 can be determined.

At 1040, the storage management device 120 may determine, from the removal period list 300, a target updated removal period in which the updated expiration time falls. For example, since the updated expiration time, 24 o'clock on Oct. 15, 2019, of chunk 140-3 falls in the removal period 320 (00:00 to 24:00 on Oct. 15, 2019), the removal period 320 can be determined as the update removal period. At 1040, the storage management device 120 may map the chunk element 353 representing the updated chunk 140-3 to the updated removal period 320.

In this way, it is easy to change the mapping of the chunk from the original removal period to the correct removal period according to the change of the expiration time of the chunk, thereby supporting the proposed efficient garbage collection process.

Figure 12:
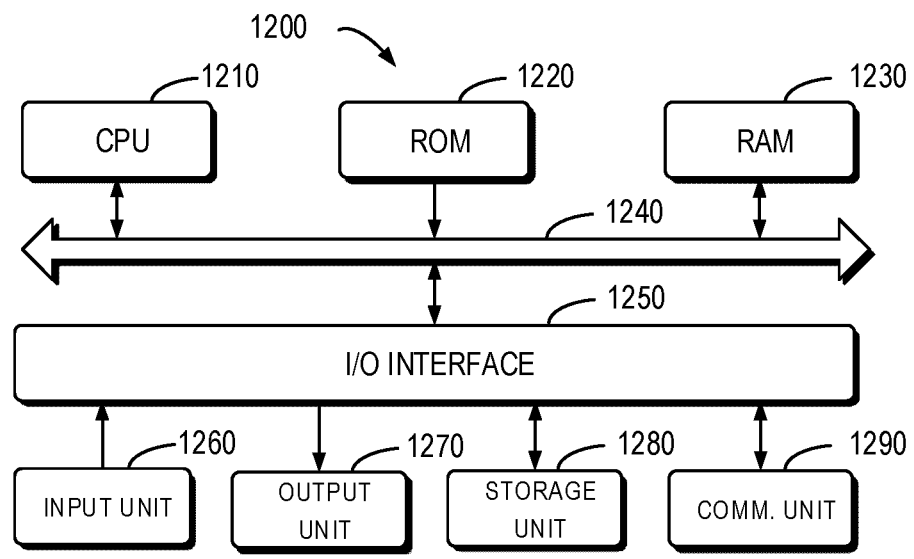
FIG. 12 is a block diagram illustrating an example device used to implement embodiments of the present disclosure.

FIG. 12 is a block diagram illustrating an example device 1200 used to implement embodiments of the present disclosure. For example, the management device 120 as shown in FIG. 1 may be implemented by the device 1200. As shown in FIG. 12, the device 1200 comprises a central processing unit (CPU) 1210 that may perform various appropriate actions and processing based on computer program instructions stored in a read-only memory (ROM) 1220 or computer program instructions loaded from a storage section 1208 to a random access memory (RAM) 1230. In the RAM 1230, various programs and data needed for operations of the device 1200 may also be stored. The CPU 1210, ROM 1220 and RAM 1230 are connected to each other via a bus 1240. An input/output (I/O) interface 1250 is also connected to the bus 1240.

The following components in the device 1200 are connected to the I/O interface 1250: an input 1260 such as a keyboard, a mouse and the like; an output unit 1270 including various kinds of displays and a loudspeaker, etc.; a memory unit 1280 including a magnetic disk, an optical disk, and etc.; a communication unit 1290 including a network card, a modem, and a wireless communication transceiver, etc. The communication unit 1290 allows the device 1200 to exchange information/data with other devices through a computer network such as the Internet and/or various kinds of telecommunications networks.

Various processes and processing described above, e.g., the method 200, 800 and 1000, may be executed by the processing unit 1210. For example, in some embodiments, the method 300 may be implemented as a computer software program that is tangibly embodied on a machine-readable medium, e.g., the storage unit 1280. In some embodiments, part or all of the computer programs may be loaded and/or mounted onto the device 1200 via ROM 1220 and/or communication unit 1290. When the computer program is loaded to the RAM 1230 and executed by the CPU 1210, one or more steps of the methods 200, 800 and 1000 as described above may be executed.

The present disclosure may be a method, an apparatus, a system, and/or a computer program product. The computer program product may include a computer-readable storage medium having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable journal logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for storage management, comprising:
   obtaining time information related to a removal time point for a backup storage system, the time information indicating that a chunk in the backup storage system whose expiration time does not exceed the removal time point is to be removed;
   determining, from a removal period list, a target removal period whose end time does not exceed the removal time point, each removal period in the removal period list being mapped to at least one chunk element, the at least one chunk element representing at least one chunk in the backup storage system whose expiration time is within the removal period to which the at least one chunk element is mapped;
   determining at least one target chunk element to which the target removal period is mapped; and
   removing, from the backup storage system, at least one target chunk corresponding to the at least one target chunk element.

2. The method of claim 1, further comprising:
   in accordance with a determination that the at least one target chunk is removed, removing the target removal period and the at least one target chunk element.

3. The method of claim 2, further comprising:
   in accordance with a determination that the target removal period and the at least one target chunk element are removed, dividing a removal-period-to-be-divided in the removal period list into at least a first removal period and a second removal period;
   dividing at least one chunk element, to which the removal-period-to-be-divided is mapped, into a first group of chunk elements and a second group of chunk elements, an expiration time of a chunk in the backup storage system represented by the first group of chunk elements falling in the first removal period, an expiration time of a chunk in the backup storage system represented by the second group of chunk elements falling in the second removal period; and
   mapping the first group of chunk elements to the first removal period and mapping the second group of chunk elements to the second removal period.

4. The method of claim 1, further comprising:
   obtaining identification indicating an expiration time of a newly-created chunk in the backup storage system;
   determining a removal-period-to-be-mapped for the newly-created chunk based on the expiration time of the newly-created chunk, the expiration time of the newly-created chunk falling in the removal-period-to-be-mapped, the removal-period-to-be-mapped being included in the removal period list;
   generating a chunk element representing the newly-created chunk based on at least the identification and the expiration time of the newly-created chunk; and
   mapping the chunk element representing the newly-created chunk to the removal-period-to-be-mapped.

5. The method of claim 4, wherein generating the chunk element representing the newly-created chunk further comprises:
- determining a type of the newly-created chunk and a storage location for storing the chunk element representing the newly-created chunk; and
- generating a chunk element representing the newly-created chunk based on the type and the storage location.

6. The method of claim 5, wherein the type of the newly-created chunk is selected from the following type group:
- a directory-composite chunk type used to store directory information of backup data in the backup storage system;
- a data chunk type used to store the backup data; and
- an index-composite chunk type used to store an index of the data chunk type.

7. The method of claim 1, further comprising:
- obtaining original expiration time, updated expiration time and identification of an updated chunk in the backup storage system;
- determining, based on the original expiration time and from the removal period list, an original removal period in which the original expiration time falls;
- determining, based on the identification of the updated chunk, a chunk element representing the updated chunk from at least one chunk element to which the original removal period is mapped;
- determining, from the removal period list, a target updated removal period in which the updated expiration time falls; and
- mapping a chunk element representing the updated chunk to the target updated removal period.

8. A device for storage management, comprising:
- at least one processing unit;
- at least one memory coupled to the at least one processing unit and storing instructions for execution by the at least one processing unit, the instructions, when executed by the at least one processing unit, causing the device to perform operations, the operations comprising:
  - obtaining time information related to a removal time point for a backup storage system, the time information indicating that a chunk in the backup storage system whose expiration time does not exceed the removal time point is to be removed;
  - determining, from a removal period list, a target removal period whose end time does not exceed the removal time point, each removal period in the removal period list being mapped to at least one chunk element, the at least one chunk element representing at least one chunk in the backup storage system whose expiration time is within the removal period to which the at least one chunk element is mapped;
  - determining at least one target chunk element to which the target removal period is mapped; and
  - removing, from the backup storage system, at least one target chunk corresponding to the at least one target chunk element.

9. The device of claim 8, wherein the operations further comprise:
- in accordance with a determination that the at least one target chunk is removed, removing the target removal period and the at least one target chunk element.

10. The device of claim 9, wherein the operations further comprise:
- in accordance with a determination that the target removal period and the at least one target chunk element are removed, dividing a removal-period-to-be-divided in the removal period list into at least a first removal period and a second removal period;
- dividing at least one chunk element, to which the removal-period-to-be-divided is mapped, into a first group of chunk elements and a second group of chunk elements, an expiration time of a chunk in the backup storage system represented by the first group of chunk elements falling in the first removal period, an expiration time of a chunk in the backup storage system represented by the second group of chunk elements falling in the second removal period; and
- mapping the first group of chunk elements to the first removal period and mapping the second group of chunk elements to the second removal period.

11. The device of claim 8, wherein the operations further comprise:
- obtaining identification indicating an expiration time of a newly created chunk in the backup storage system;
- determining a removal-period-to-be-mapped for the newly-created chunk based on the expiration time of the newly-created chunk, the expiration time of the newly-created chunk falling in the removal-period-to-be-mapped, the removal-period-to-be-mapped being included in the removal period list;
- generating a chunk element representing the newly created chunk based on at least the identification and the expiration time of the newly created chunk; and
- mapping the chunk element representing the newly created chunk to the removal-period-to-be-mapped.

12. The device of claim 11, wherein generating the chunk element representing the newly created chunk further comprises:
- determining a type of the newly created chunk and a storage location for storing the chunk element representing the newly created chunk; and
- generating a chunk element representing the newly created chunk based on the type and the storage location.

13. The device of claim 12, wherein the type of the newly created chunk is selected from the following type group:
- a directory-composite chunk type used to store directory information of backup data in the backup storage system;
- a data chunk type used to store the backup data; and
- an index-composite chunk type used to store an index of the data chunk type.

14. The device of claim 8, wherein the operations further comprise:
- obtaining original expiration time, updated expiration time and identification of an updated chunk in the backup storage system;
- determining, based on the original expiration time and from the removal period list, an original removal period in which the original expiration time falls;
- determining, based on the identification of the updated chunk, a chunk element representing the updated chunk from at least one chunk element to which the original removal period is mapped;
- determining, from the removal period list, a target updated removal period in which the updated expiration time falls; and
- mapping a chunk element representing the updated chunk to the target updated removal period.

15. A computer program product tangibly stored on a non-transitory computer-readable medium and comprising machine-executable instructions that, when executed, cause a machine to perform operations, the operations comprising:

obtaining time information related to a removal time point for a backup storage system, the time information indicating that a chunk in the backup storage system whose expiration time does not exceed the removal time point is to be removed;

determining, from a removal period list, a target removal period whose end time does not exceed the removal time point, each removal period in the removal period list being mapped to at least one chunk element, the at least one chunk element representing at least one chunk in the backup storage system whose expiration time is within the removal period to which the at least one chunk element is mapped;

determining at least one target chunk element to which the target removal period is mapped; and removing, from the backup storage system, at least one target chunk corresponding to the at least one target chunk element.

16. The computer program product of claim 15, wherein the operations further comprise:

in accordance with a determination that the at least one target chunk is removed, removing the target removal period and the at least one target chunk element.

17. The computer program product of claim 16, wherein the operations further comprise:

in accordance with a determination that the target removal period and the at least one target chunk element are removed, dividing a removal-period-to-be-divided in the removal period list into at least a first removal period and a second removal period;

dividing at least one chunk element, to which the removal-period-to-be-divided is mapped, into a first group of chunk elements and a second group of chunk elements, an expiration time of a chunk in the backup storage system represented by the first group of chunk elements falling in the first removal period, an expiration time of a chunk in the backup storage system represented by the second group of chunk elements falling in the second removal period; and mapping the first group of chunk elements to the first removal period and mapping the second group of chunk elements to the second removal period.

18. The computer program product of claim 15, wherein the operations further comprise:

obtaining identification indicating an expiration time of a newly created chunk in the backup storage system;

determining a removal-period-to-be-mapped for the newly-created chunk based on the expiration time of the newly-created chunk, the expiration time of the newly-created chunk falling in the removal-period-to-be-mapped, the removal-period-to-be-mapped being included in the removal period list;

generating a chunk element representing the newly created chunk based on at least the identification and the expiration time of the newly created chunk; and mapping the chunk element representing the newly created chunk to the removal-period-to-be-mapped.

19. The computer program product of claim 18, wherein generating the chunk element representing the newly created chunk further comprises:

determining a type of the newly created chunk and a storage location for storing the chunk element representing the newly created chunk; and generating a chunk element representing the newly created chunk based on the type and the storage location.

20. The computer program product of claim 19, wherein the type of the newly created chunk is selected from the following type group:

a directory-composite chunk type used to store directory information of backup data in the backup storage system;

a data chunk type used to store the backup data; and an index-composite chunk type used to store an index of the data chunk type.

21. The computer program product of claim 15, wherein the operations further comprise:

obtaining original expiration time, updated expiration time and identification of an updated chunk in the backup storage system;

determining, based on the original expiration time and from the removal period list, an original removal period in which the original expiration time falls;

determining, based on the identification of the updated chunk, a chunk element representing the updated chunk from at least one chunk element to which the original removal period is mapped;

determining, from the removal period list, a target updated removal period in which the updated expiration time falls; and mapping a chunk element representing the updated chunk to the target updated removal period.

* * * * *